US008140432B2

(12) United States Patent  (10) Patent No.: US 8,140,432 B2
Johnson  (45) Date of Patent: Mar. 20, 2012

(54) AGGREGATED POSTAL BILLING AND PAYMENT METHODS AND SYSTEMS

(75) Inventor: Richard C. Johnson, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 32 days.

(21) Appl. No.: 12/855,985

(22) Filed: Aug. 13, 2010

(65) Prior Publication Data

US 2010/0306104 A1  Dec. 2, 2010

Related U.S. Application Data

(63) Continuation of application No. 10/346,500, filed on Jan. 15, 2003, now Pat. No. 7,814,012.

(60) Provisional application No. 60/432,827, filed on Dec. 12, 2002.

(51) Int. Cl.
G06Q 40/00 (2006.01)
(52) U.S. Cl. ................. 705/40; 705/34; 705/39; 705/38
(58) Field of Classification Search ..................... 705/40, 705/39, 38, 34
See application file for complete search history.

(56) References Cited

U.S. PATENT DOCUMENTS

| | | | |
|---|---|---|---|
| 5,051,914 A | 9/1991 | Sansone et al. | |
| 5,873,072 A | 2/1999 | Kight et al. | |
| 5,974,146 A | 10/1999 | Randle et al. | |
| 5,978,780 A | 11/1999 | Watson | |
| 6,078,907 A | 6/2000 | Lamm | |
| 6,289,322 B1 | 9/2001 | Kitchen et al. | |
| 6,578,015 B1 | 6/2003 | Haseltine et al. | |
| 6,859,212 B2 | 2/2005 | Kumar et al. | |
| 6,993,507 B2 | 1/2006 | Meyer et al. | |

FOREIGN PATENT DOCUMENTS

| | | |
|---|---|---|
| JP | 2001-250069 | 9/2001 |
| JP | 2002-259859 | 9/2002 |
| JP | 2002-342689 | 11/2002 |
| WO | WO 01/82162 A1 | 1/2001 |

OTHER PUBLICATIONS

Examination Report received in corresponding Indian Application No. 1112/KOL NP/05.

*Primary Examiner* — Daniel Felten
(74) *Attorney, Agent, or Firm* — Kilpatrick Townsend & Stockton LLP

(57) ABSTRACT

A computer-implemented method for a trusted entity such as a Post Office to process bills from a plurality of billers includes generating aggregated listings of bills to be submitted each identified customer and making the aggregated listings available to each identified customer. The trusted entity may then receive orders to effectuate payment of selected ones of the bills in the aggregated listings from customers. The first trusted entity may request that a second trusted entity designated by each identified customer (such as a bank) guarantee availability of funds sufficient to cover payment of the bills selected for payment. A third trusted entity (a central bank) may then be instructed to carry out the payments specified in each of the received orders in batch mode by transferring the payments from the second trusted entities designated by the customers to respective fourth trusted entities (e.g., banks) designated by the billers.

41 Claims, 3 Drawing Sheets

AGGREGATED POSTAL BILLING AND PAYMENT METHODS AND SYSTEMS

BACKGROUND OF THE INVENTION

1. Field of the Invention

This invention relates to the field of electronic bill aggregation, presentment and payment.

2. Description of the Related Art

Current methods and systems for electronic bill presentment and payment, such as credit cards and paper checks do not adequately meet the needs of buyers and sellers. New methods and systems for bill aggregation, presentment and payment are needed, irrespective of whether the underlying transactions occurred in person, over the telephone or via the Internet. Any new methods and systems that would replace or supplement existing bill presentment and payment methods and system must be designed with security as a prime consideration and the institution that implements such methods and systems must be trustworthy.

On the buyer side of the transactions, one of the prime concerns is to minimize transaction costs. Building in cost of credit to the payment transaction where it is not needed merely adds to the price the buyer must pay. Moreover, the buyer typically does not wish to pay the seller before the goods have been received and inspected. Many transactions may be characterized as one-time purchases, such as when the buyer buys a book from an online retailer. Others purchases are recurrent and periodic in nature. Examples of such recurrent and periodic purchases include charges for electric power, telephone service, a mortgage, or other transactions for which payment is delayed. All of these purchases for which vendors send periodic bills or invoices to consumers result in heavy and low profit margin postal traffic, as bills are sent to buyers and payment (usually in check form) is sent to sellers, usually via first class mail.

On the seller side of such transactions, sellers want quick and certain payment, and often offer discounts for quick payment. The cost of credit is often high for sellers and, if sellers factor accounts receivable, the cost of credit may come close to or exceed their profit margin. Late or defaulted payments by buyers make it difficult for the seller to meet its fixed expenses (such as payroll, for example), which must be met on a timely basis. Other expenses of seller include the cost of preparing and mailing printed bills. The buyer also incurs the cost of sending payments in response to the vendors' bills and invoices. Late or defaulted payments, therefore, can threaten the very existence of smaller companies. Sellers of all sizes go to great lengths, therefore, to establish the creditworthiness of their customers. From the seller's point of view, transactions for which the buyers are slow in paying become (unwanted) credit transactions by their very nature. Concerns for creditworthiness inevitably clog the payment system and slow down the business-to-business (B2B) process.

Well-founded concerns regarding security issues related to buying and selling over the Internet must be met if electronic commerce is to reach its potential. Concerns over privacy and the safeguarding of individual and business information must also be addressed, or the government may ultimately step in and mandate regulation. In addition, business users require convenience and transparency in the operation of security features. Indeed, both security and ease of use are firm requirements for payment service user satisfaction.

Consumer electronic commerce, based on Web stores, seems far removed from business to business-electronic commerce and supplier auction of commodities and services. Yet, both rely on timely payments and neither is content with a system that is electronic on the seller side and a slow, wasteful paper-based process sending buyer payments or an inadequate and costly credit card process.

The buyer now using credit cards for Internet payment must usually log in separately for each Web site at which the buyer wishes buy goods or services. Actually buying something with an online vendor usually entails filling out a form for each Web site and providing a great deal of business and/or personal information. In effect, the buyer must fill out a credit application for each seller, irrespective of whether the buyer actually wishes to establish a credit relationship with the vendor or not. Payment by credit card is usually authenticated by the information provided by the buyer and often includes additional security measures, such as digital certificates. Buyers may or may not need to charge. However, the current payment paradigm on the Web effectively forces buyers to use credit or to stay off the Web. If a business has low profit margins, the charges for credit or purchasing cards may force the cost of payment to exceed the profit. Such businesses cannot tolerate such charges, particularly in the face of current trends including auctions and electronic purchasing that operate to further drive down profit margins for suppliers.

What are needed, therefore, are methods and systems to enable sellers to reduce the high transaction costs associated with billing and the consequent extension of credit to buyers. What are needed are methods and systems to enable vendor bills to be aggregated, presented to the buyers and paid by the buyers in a secure, convenient and low cost manner.

SUMMARY OF THE INVENTION

An object of the present invention, therefore, is to provide secure, low cost and reliable methods for presenting and carrying out the payment of bills. It is another object of the present invention to leverage existing infrastructure such as the Post Office and the Federal Reserve Banks to reduce the number of individual paper bills that are printed, processed, sorted and delivered to both corporate and individual customers while decreasing the latency between bill presentation and bill payment.

In accordance with the above-described objects and those that will be mentioned and will become apparent below, a computer-implemented method for a Post Office to process bills includes receiving a first list of bill recipients and corresponding first amounts owed by each bill recipient from a first biller; receiving a second list of bill recipients and corresponding second amounts owed by each bill recipient from a second biller; generating, for each bill recipient, an aggregated listing of the first and second amounts owed by each of the first and second billers; making the aggregated listing available to each corresponding bill recipient; receiving, from one of the bill recipients, an order instructing the Post Office to cause a payment of at least one of the first and second amounts listed in the aggregated listing, and instructing a financial service provider to effectuate the payment specified in the received order.

The instructing step may instruct the financial service provider to transfer the ordered payment from a predetermined numbered account designated by the bill recipient to at least one of a first numbered account designated by the first biller and a second numbered account designated by the second biller.

The financial service provider in the instructing step may be a central bank such as the Federal Reserve Bank. The making available step may include generating and sending an email message that may include the aggregated listing of the first and second amounts owed by each of the first and second billers. The making available step may include printing the aggregated listing of the first and second amounts owed by each of the first and second billers and mailing the printed aggregated listing to each of the each of the first and second billers. The email message may be secure. For example, the generated email message may be sent in encrypted form according to a certificate issued from a trusted certificate issuing authority. The trusted certificate issuing authority may be the Post Office. The making available step may make the generated aggregated listing available via a web site. The order received in the receiving step may include detailed payment instructions including an amount to be paid, a date on which the central bank may be instructed to effectuate the payment and/or an indication as to whether the first and/or second amount owed is to be disputed. A step of charging a fee from each of the first and second billers may also be carried out. The generated aggregated listing may be made available to each bill recipient in electronic form and may include a link to the predetermined numbered account designated by the bill recipient, the link being effective to enable the bill recipient to access at least an account balance of the designated numbered account. The instructing step may be carried out in batch mode, to instruct the financial service provider to effectuate a plurality of payments specified in a corresponding plurality of received orders. The first and second lists received from the first and second billers may be machine-readable. The received first and second lists may be in electronic form. The order in the receiving step may be configured as a multipart draft that details amounts to be paid to each of the first and second billers. The generating step may include a step of including a promotional message along with the aggregated listing. The generated aggregated listing and the promotional message may be generated in electronic form. The received order may instruct the Post Office to cause the payment of the first and/or second amounts listed in the aggregated listing at a predetermined date in the future. The generating step may be carried out at a predetermined date selected by each bill recipient. A step of sequestering or debiting an amount of money at least equal to the payment specified in the received order from a predetermined numbered account designated by the bill recipient may be carried out, to insure that sufficient funds are available when the payment is effectuated.

According to an embodiment thereof, the present invention is a computer-implemented method for a first trusted entity to process bills, including the steps of receiving a list from each of a plurality of billers, each list including bills to be submitted to identified customers; from the received lists, generating an aggregated listing for each identified customer, the aggregated listing including the bills to be submitted by each of the plurality of billers to each identified customer; making each generated aggregated listing available to each corresponding identified customer; receiving, from the identified customers, orders to effectuate payment of selected ones of the bills in the aggregated listings; for each received order, instructing a second trusted entity designated by each identified customer to guarantee availability of funds sufficient to cover payment of the bills selected for payment, and instructing a third trusted entity to carry out the payments specified in each of the received orders by transferring the payments from the second trusted entities designated by the customers to respective fourth trusted entities designated by the billers.

The first trusted entity may be the Post Office. The second and fourth trusted entities may be banks or other financial services providers. The third trusted entity may be a central bank (such as the Federal Reserve Bank system in the United States). The second trusted entity designated by each identified customer may guarantee availability of funds sufficient to cover payment by sequestering the funds, extending credit or debiting a designated account, for example.

The present invention may also be viewed as computer systems configured to carry out the above steps or as a machine-readable media having data stored thereon representing sequences of instructions which, when executed by one or more computers coupled to a secure network, causes at least one of the computers to perform the above steps.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Functional Overview

Figure 1:
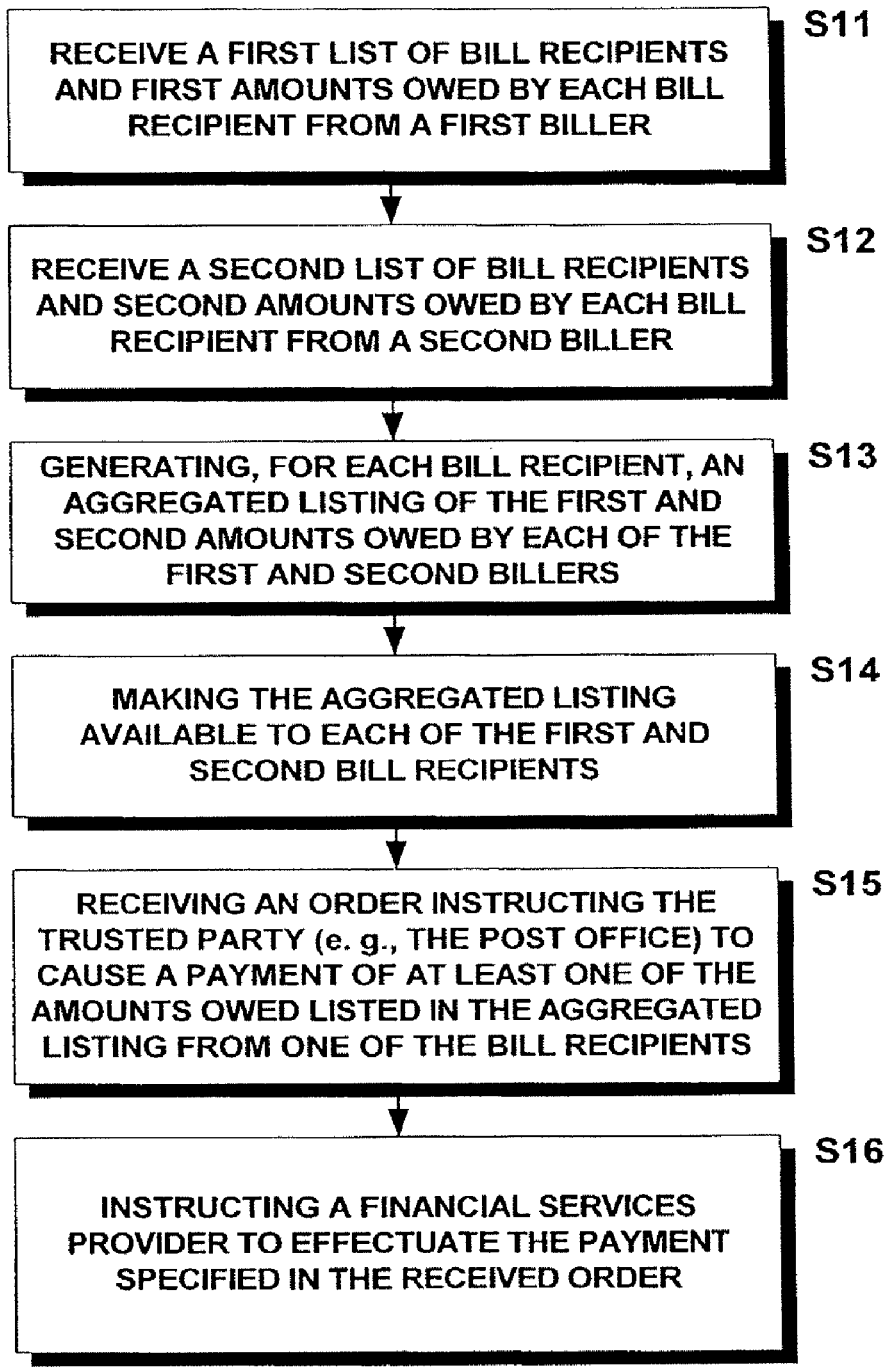
FIG. 1 is a flowchart of a method according to an embodiment of the present invention.
Figure 2:
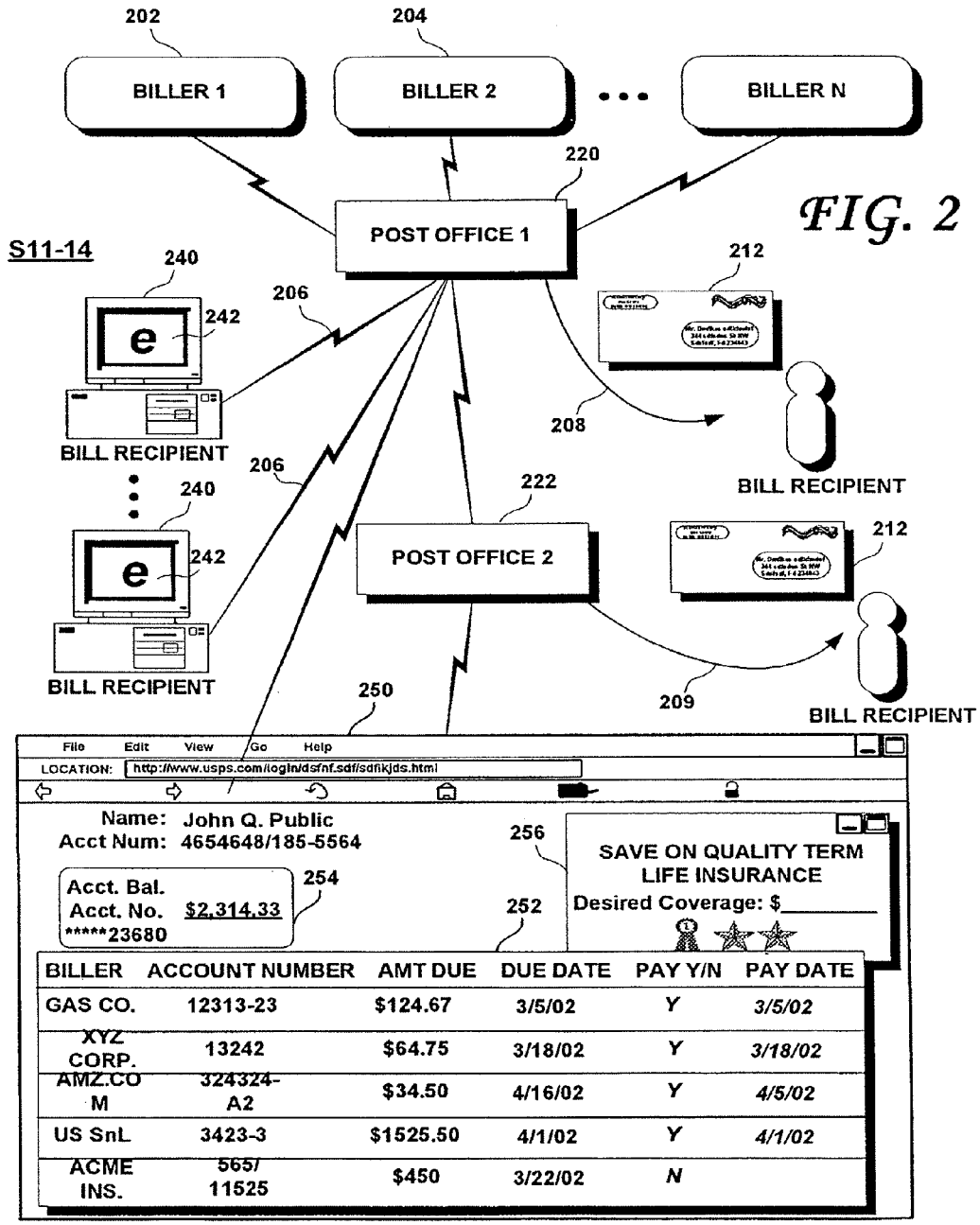
FIG. 2 is a diagram illustrating further aspects of the present invention.

FIG. 1 is a flowchart of an embodiment of the present invention. FIG. 2 is a diagram illustrating further aspects of the present invention. Considering now FIGS. 1 and 2 collectively, a trusted entity 220 (such as, for example, the Post Office) may process bills (e.g., collect, aggregate, present the aggregated bills to its customer and process payment thereof) according to the present invention, by carrying out some or all of the following steps. The Post Office may be the United States Post Office or USPS, although the present invention is applicable to other trusted entities as well as to the Post Offices of other countries. As shown at step S11, the present method calls for the Post Office 220 to receive a first list of bill recipients (customers or buyers) and corresponding first amounts owed by each bill recipient from a first biller (a seller), referenced in FIG. 2 at 202. That is, a biller 202 (such as the electric company, for example) may periodically send to the Post Office 220 a list containing (at least) names (or unique customer identifiers) and amounts owed by the biller's customers, together with other information, such as the bill recipients' address, whether physical or electronic. The list of names and corresponding amounts owed may be quite large, especially for utility companies, such as the water or electric companies that serve nearly all households. As shown at S12, the Post Office 220 may also receive one or more second lists of bill recipients and corresponding second amounts owed by each bill recipient from one or more second billers 204. According to the present invention, the Post Office 220 (or other trusted party) receives a list from each participating biller, each list including at least the names or identifiers for its customers and the amounts owed by each listed customer. Much more information may be included in the lists provided by the billers such as, for example, interest rates, payoff amounts, minimum payment and the like. At S13, the Post Office 220 may then generate, for each bill recipient, an aggregated listing of at least the first and second amounts owed by each of the first and second billers, as compiled from the lists sent to the Post Office by the billers 202, 204. In practice, the bills from a great many billers may be aggregated in the listing. Both the billers and the Post Office may experience dramatically lower costs by making aggregated bills viewable and available securely to the bill recipient or to the authorized representatives thereof, whether such bill recipient is a corporation or an individual.

The generated aggregated listing may then be made available to the bill recipients, as outlined in step S14. A simplified but exemplary aggregated listing is shown in FIG. 2 at reference numeral 252. According to the present invention, the generated aggregated listing 252 may be stored on a Post Office server that is accessible by the bill recipients. For example, the generated aggregated listing for each bill recipient may be made available through a secure Web site 250 that is only accessible to properly authenticated bill recipients. Alternatively (or in addition to the Web site 250), the Post Office 220 may generate and send an email 242 to the bill recipients 240 over a secure channel, such as shown at 206. The emails 242 sent to the bill recipients 240 may include a link to a personalized Web site 250 and/or may display the aggregated listing directly in the email, for example.

The emails 242, Web sites 250 and all other communications between the parties to the transactions are preferably secure and viewable only by the intended recipient. Banks provide security to the transactions of their customers. In the U.S., the federal government regulates the measures taken by banks to insure that their customer's use of bank accounts and credit card transactions remains free of fraud and money laundering. The Post Office or other FSP assuming that role may find it advantageous to work with the banks to provide the desired level of security. Of course, the Post Office is itself subject to regulation and rules that protect the postal patron.

For corporate users, the process of opening an account at a bank by vote of the board of directors and building the structure of authorized account roles on the signature card is a known and well-understood process. Such a process insures against fraud and misrepresentation and provides the bank with the ability to know its customer, as is their duty under federal regulations. Thus, a person approved by a bank to access an account must be deemed as having been authenticated. Further postal authority determination of identity strengthens this presumption.

To insure that those purporting to represent a business in an electronic transaction do, in fact, have the authority to bind the business, the banking or postal signature card may be supplemented by extending it on the authority of appropriate existing signatories. Additionally, the banking or postal signature card may also be supplemented by adding electronic banking and postal services to the privileges of appropriate signatories to the basic corporate and personal documents on file at the bank and Post Office. Thus, the Post Office may be assured that those contacting it from a given corporate customer or on behalf of a postal patron have the full authorization of that customer for the transactions they initiate or consummate.

The communications to and from the Post Office, such as the emails sent by the Post Office 220 to the bill recipients may be digitally signed and encrypted and optionally augmented by other security measures deemed appropriate. Digital certificates may be used to good advantage in this regard. The certificate issuing authority may include VeriSign, Inc., for example, or even the Post Office 220 itself Other means of securing the emails and/or authenticating the bill recipient may be devised and implemented within the context of the present invention. The postal authorities may also identify bill recipients by appropriate means, including smart cards, biometrics and the like.

For bill recipients that do not have a network-enabled computer or who prefer to receive a paper version of the aggregated listing, the generated aggregated listing may be printed out by the Post Office and sent as a letter 212 to the bill recipient at his or her regular address, via regular mail, as shown at 208. As shown, the generated aggregated listing (or alternatively the raw lists from the billers 202, 204) may be forwarded from a first Post Office 220 to another Post Office 222 that may be physically closer to the bill recipients, to reduce the Post Office's handling costs. The physically closer Post Office 222 may then print out the generated aggregated listing and send it via regular mail to the bill recipient, as suggested by 209. Upon receipt of the printed aggregated listing, the bill recipient may then make an indication of the credit card or bank account to be used for payment, the date of payment, and the amount of payment (if not the due date) for each listed biller, directly on the printed aggregated listing. Coupons for each bill will allow separation of specific billing items, and the inclusion of individual promotional messages will provide the billers with the same range of advertising opportunities they have at present with separate bills. Separated or not, the return of machine readable completed (i.e., including an indication of which billers to pay and when the billers should be paid) aggregated listing forms to the Post Office 220 or 222 will allow the Post Office to electronically sort and to communicate the results thereof back to the billers. The completed paper aggregated listings effectively constitute unconditional orders to pay the designated amounts and may be sent either directly to the FSP (such as the Federal Reserve Banks) for account transfer or to the Post Office partner bank(s) for payment service. Presenting the aggregate listing of bills to the bill recipient allows the recipient to decide which listed amounts should be paid and to mark the (preferably machine readable) aggregate listing form accordingly. The marked up aggregate listing effectively constitutes a multipart check or draft with multiple payees. This check, once machine entered, can be executed electronically and at once; dates of payment will be sorted and payment orders issued by the postal system on appropriate days as a batch process.

Other means of making the generated aggregated listing available to the bill recipients may be implemented within the scope of the present invention, as the examples given herein (i.e., paper, email and a Web site) are not intended to constitute an exhaustive listing of ways with which the listing may be made available to the bill recipients.

After receipt of the aggregated listing, the bill recipients (whether they have received the listing through the mail, via email, via a Web site or by other electronic means) have the opportunity to review the aggregated listing and to decide whether, when and how much to pay each listed biller. Thereafter, the trusted party that aggregated the list and made the aggregated listing available to the bill recipients may receive, from one or more of the bill recipients, an order instructing the trusted party (e.g., the Post Office) to cause the payment of one or more of the amounts listed in the aggregated listing, as shown at S15. The order to pay, for example, may be generated by the bill recipient or may be generated automatically, following the bill recipient's standing orders. For example, the bill recipient may have previously specified that her electric bill is to be paid in full on the last day before the bill's due date, without further input or intervention. Alternatively, the bill recipient may order the Post Office 220 to cause the payment of only specifically designated ones of the amounts listed in the aggregated listing, in part or in full. Alternatively still, the bill recipient may order the Post Office 220 to cause the payment of designated ones of the amounts due on a specified date in the future. There may also be included in the aggregated listing the ability to signal the bill recipient's intention to dispute one or more of the amounts listed in the aggregated list. This may trigger the biller to contact the bill recipient to resolve the disputed bill, for example. The recipient of the aggregated listing may order the Post Office 220, 222 to cause the payment (or partial payment) of all, some or none of the listed amounts owed, at the sole discretion of the bill recipient.

Upon receipt of instructions ordering the Post Office to cause the payment of one or more amounts in the aggregated listing made available to the bill recipient, the Post Office 220, according to an embodiment of the present invention, instructs a Financial Services Provider (hereafter, FSP) to transfer the ordered payment the bill recipient's bank account to the biller's bank account, as shown at S16. Herein, the terms "Financial Services Provider", "FSP" and "bank" are used interchangeably and shall be understood to include all financial services institutions accepting deposits of cash, negotiable securities, marketable shares/stock into numbered (or otherwise uniquely-identified) accounts and honoring checks, drafts and/or other customer instructions. Such a definition includes (but is not limited to) traditional banks and savings institutions, stockbrokers, online trading concerns, credit unions and any institution that legally identifies with and has some financial relationship with an account holder and that has the ability to honor customer or account holder instructions referring to specific accounts. The applicability of the present invention extends also to such institutions governmental agencies that carry out banking or quasi-banking functions, assuming that such institutions and agencies maintain numbered (or otherwise uniquely identified) accounts and require proof of identity similar to that required at banks; namely, in person signature to set up the numbered account at the institution and agreeing to the terms of service for participation in the system according to the present invention. The Internal Revenue Service (IRS) may be thought of as another example of such a governmental agency.

In detail, the Post Office 220 instructs the FSP to transfer the payment ordered by the bill recipient from a predetermined numbered account designated by the bill recipient to a predetermined numbered account designated by the biller. According to an embodiment of the present invention, the FSP may advantageously be the central bank of the country in which the invention is practiced. In the United States, the Federal Reserve Bank may assume the role of the FSP to great advantage. Indeed, the preferred FSP in the United States for the present invention is the Federal Reserve Bank system, for its facility in transferring funds between accounts and its ability to perform high volume low cost inter-bank transfers. According to this embodiment, therefore, the Post Office, responsive to instructions from the bill recipients, issues instructions to the Federal Reserve Bank to debit the amount specified by the bill recipient from a numbered account specified by the bill recipient and correspondingly credit a predetermined numbered account specified by the biller. This may conveniently be carried out in batch mode, whereby the Federal Reserve Bank electronically carries out many small transfers at a specified time and in a specified manner.

The cost of making such payments must be low in an environment where buyers seek the lowest price and sellers are squeezed on margin. Price sensitivity will lead to a quick dominance of the lowest price payment process, and the business of facilitating payment is itself expected to become a commodity business. Profit potential will lie not just in the fees charged by financial institutions for payment services but also in the myriad services that businesses will require in connection with payment. At the outset, the Post Office may charge the billers and/or the bill recipients a small fee for each transfer. In addition, the Federal Reserve Bank (or other FSP) may also charge a fee for each transaction or for a set number of transactions, as agreed to between the parties. Additionally, small fees may be assessed for messaging, security services and devices, and the delivery of related services. These are examples of how the Post Office authorities may profit from use of the present invention, in an environment in which the volume of individual paper bills that are physically delivered (a labor intensive and low-profit margin undertaking) decreases and the number of aggregated bills increases.

As shown at reference 254 in FIG. 2, the Web site 250 and/or the emails including the aggregated listing of amounts owed may include a link to or a visual indication of the balance of the bill recipient's account at his or her bank. The account number shown adjacent the balance may be linked to the bill recipient's account, thereby enabling the bill recipient to fully access his or her account. Whether communicated via email or via a Web site, the aggregated listing from the various billers 202, 204 may include, for example, the biller, the bill recipient's account number with the biller, the current amount due and the due date. The aggregated list, however, is not so limited and may be as rich as desired. For example, the account number (or any other field) may be electronically linked to the biller's Web site and may provide the bill recipient with full details of his or her purchases, usage patterns and the like.

It is to be noted that the Post Office is but one of many entities that may carry out the present invention. Indeed, other trusted entities may advantageously carry out the present invention such as, for example, the Post Offices of foreign countries, financial services providers or any entity that is charged with or has an existing fiduciary duty to securely maintain its customer's confidential (e.g., financial and/or personal) information. The Post Office (as well as foreign Post Offices), however, is in a unique position, as it already knows who and where its customers are and is an impartial, disinterested party to transactions between the billers and its customers.

As shown at reference numeral 256, the Web site 250 generated for the bill recipient and/or the email sent to the bill recipient may include one or more promotional messages. Such a promotional message is shown in FIG. 2 as a pop-up window in the Web site, although the present invention is not limited thereto.

Using generally accepted legal terms, a draft is a written order by a first party, called the drawer, instructing a second party, called the drawee, to pay money to a third party, called the payee. In terms of e-commerce and the present invention, the payee may be thought of as the biller, the drawer may be thought of as the bill recipient and the drawee may be thought of as the bill recipient's bank. Each order by the bill recipient may be thought of, within the context of the present invention, as a draft—a written order to the biller's FSP to pay money to the biller drawn from an account designated by the bill recipient. Moreover, the aggregated listing sent to and/or made available to each bill recipient may be thought of as a multi-part draft that details amounts to be paid to each biller. For example, as shown at 252, the aggregated listing may include a field that enables the bill recipient to indicate which of the billed amounts the bill recipient wishes to pay. Another field may be provided to enable the bill recipient to indicate when the billed amount is to be paid.

In the example shown in FIG. 2, the bill recipient has indicated that the amounts owed to Gas Co., XYZ Co., AMZ-.COM and US S&L should be paid. The bill recipient has also indicated the dates on which the amounts owed these billers should be paid. The bill recipient, in this example, has indicated that the amount owed to ACME INS. should not be paid—and thus does not indicate a pay date for this amount. After having decided which of the amounts presented for payment in the aggregated listing 252 should be paid, the bill recipient may order the Post Office 220 to cause the payment of these amounts on the dates specified. This order is akin a to a multipart draft that authorizes the FSP to debit one or more predetermined accounts of the bill recipient and to correspondingly credit one or more predetermined accounts of the biller designated to be paid.

According to an embodiment of the present invention, when the Post Office receives the order from the bill recipient to pay one or more amounts listed in the aggregated listing, the Post Office may notify the bill recipient's bank to debit or sequester funds at least equal to the sum of the payments to be made. Rather than debiting or sequestering the funds, the bill recipient's bank may decrease the amounts available in a letter of credit, line of credit, overdraft protection or similar instrument, up to the agreed upon credit limits. This debiting or sequestration insures that the funds are available when the actual transfer takes place. In this manner, when the Federal Reserve Bank or other trusted entity carries out the transfer of funds between the bill recipient's designated account and the biller's designated account, the bill recipient's bank can guarantee payment to the biller. If sequestration or debit of funds does not take place when the order to pay is received, there remains some uncertainty as to what the bill recipient's account balance will be in the future when the account is accessed again for payment.

According to the present invention, a single aggregate listing of bills replaces a considerable number of individually addressed, printed, sorted and delivered paper bills to accomplish considerable savings. These savings may be realized either with or without the bill recipient postal patron having access to a computer. Thus, according to the present invention, the delivery of bills may be performed with a many-fold increase in efficiency.

The present invention may be configured to allow for great flexibility in the payment of amounts owed, and supports contingencies and conditional payment. In the case of recurring charges from a biller (such as an electric utility, for example), logic may be set up to automatically order the Post Office to release recurring charges upon the release of a contingency (such as receipt of electric power, for example). Therefore, twelve conditional payments may be established, one each month. The buyer (bill recipient) controls payment, which may be executed immediately upon a manual or automatic release of the contingency. Indeed, contingencies may optionally be set to be automatically released at a specified monthly date and time or the contingency may be manually removed through a browser connection to the buyer's bank. Alternatively, the contingency may be removed by use of a printed form subject to machine processing. This procedure allows bill payment procedures to be integrated with the buyer's (and seller's) accounting system or an individual's checking account. Alternatively, the contingency of the payment may be lifted by the buyer after he or she has verified receipt of the goods or services provided by the seller. The present invention may be used to great advantage in combination with the iDraft, iDraftC and iLofC payment systems disclosed in commonly assigned copending U.S. patent application Ser. No. 09/405,741 filed on Sep. 24, 1999 and serial number PCT/US02/07735 the disclosure of which are incorporated herein in their entirety.

As noted above, the Federal Reserve Bank system (FRB) is the preferred agency for effectuating the transfer of funds, because of its ability to transfer funds from one bank account to another on request of its depositors (or their agents) and to execute inter-bank transfers. Many large banks also have this settlement capability. The bank is a trusted party—it is already charged with the fiduciary duty to protect its customers' confidential information—and mediates between buyers and sellers by executing payment requests according to the logic of software-generated instructions. Either the postal banks execute payments or the Federal Reserve causes an account transfer between buyer's bank and seller's bank accounts. The Federal Reserve transfer is currently priced at $0.15 per transaction for a minimum of 80,000 transactions in a month; this service is same day, irrevocable, all electronic, and a receipt is returned. This procedure allows the Post Office to pass on a patron's payment request for payment on a specific date and to get it completed on that date. No other procedure provides such precise control over payment. Most conventional online bill paying services inform their customers to expect a delay of at least 5 days for payment execution from the time payment is requested.

Marketing data is not lost as a result of the aggregation of multiple individual bills into a single aggregated listing. Indeed, such marketing data need not be accumulated at an individual level, which might violate the privacy of the individual or the business. The bank or the Post Office may aggregate transactions according to the standards set by the U.S. Census in order to provide aggregate marketing information to vendors. Such aggregate marketing data preferably does not contain low-level data sufficient to identify the individuals or businesses.

Note that the MTMC (Many to Many Correspondence) functionality of the iDraft system identified above maps well to accounts held by the Federal Reserve Banks (FRB) for all US banks. This MTMC functionality provides additional savings for participating banks in that most inter-bank transfers are accomplished via messaging between the banks. The FRB holds accounts for all the leading American banks and may transfer funds between these accounts. The bank receives an advice of payment which stipulates the specific banking client account to which the deposit is directed; the FRB will issue a real-time receipt for the payment which may be used as proof of the payment having been made. Depending on the FRB for funds transfer between financial institutions and their account-holders will be the least expensive and best form of Internet payment. MTMC is disclosed in commonly owned and copending patent application serial number PCT/US01/13307, the disclosure of which is also incorporated herein in its entirety.

Hardware Overview

Figure 3:
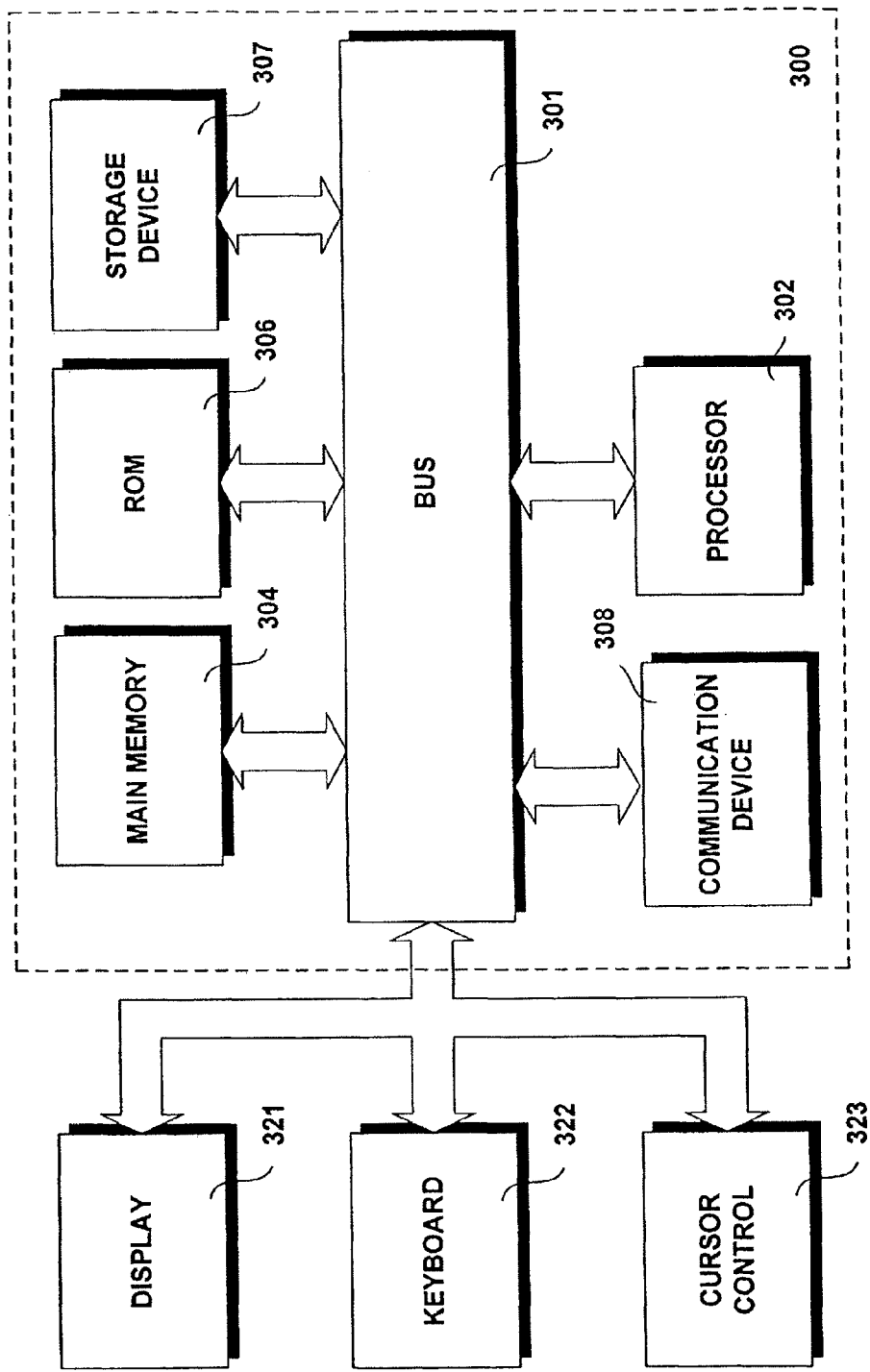
FIG. 3 is a block diagram of a computer with which aspects of the present invention may be practiced.

FIG. 3 illustrates a block diagram of a computer system 300 upon which an embodiment of the present invention may be implemented. Computer system 300 includes a bus 301 or other communication mechanism for communicating information, and a processor 302 coupled with bus 301 for processing information. Computer system 300 further comprises a random access memory (RAM) or other dynamic storage device 304 (referred to as main memory), coupled to bus 301 for storing information and instructions to be executed by processor 302. Main memory 304 also may be used for storing temporary variables or other intermediate information during execution of instructions by processor 302. Computer system 300 also includes a read only memory (ROM) and/or other static storage device 306 coupled to bus 301 for storing static information and instructions for processor 302. A data storage device 307, such as a magnetic disk or optical disk, is coupled to bus 301 for storing information and instructions.

Computer system 300 may also be coupled via bus 301 to a display device 321, such as a cathode ray tube (CRT), for displaying information to a computer user. An alphanumeric input device 322, including alphanumeric and other keys, is typically coupled to bus 301 for communicating information and command selections to processor 302. Another type of user input device is cursor control 323, such as a mouse, a trackball, or cursor direction keys for communicating direction information and command selections to processor 302 and for controlling cursor movement on display 321.

The present invention is related to the use of computer system 300 to provide an process bills on behalf of billers and their customers. According to one embodiment, the identification of actual costs is provided by one or more computer systems 300 in response to processor(s) 302 executing sequences of instructions contained in memory 304. Such instructions may be read into memory 304 from another computer-readable medium, such as data storage device 307. Execution of the sequences of instructions contained in memory 303 causes processor(s) 302 to perform the process steps that will be described hereafter. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Thus, the present invention should be limited only by the claims as set forth below.

What is claimed is:

1. A method for a Post Office to process bills, the method comprising:
    receiving, at one or more computer systems associated with the Post Office, a first electronic list of bill recipients from a first biller and corresponding first amounts owed to the first biller by each bill recipient in the first electronic list;
    receiving, at the one or more computer systems associated with the Post Office, a second electronic list of bill recipients from a second biller and corresponding second amounts owed to the second biller by each bill recipient in the second electronic list;
    generating, for each bill recipient in the first and second electronic lists of bill recipients, an electronic aggregated listing of the first and second amounts owed to each of the first and second billers by each corresponding billing recipient with one or more processors associated with the one or more computer systems associated with the Post Office;
    making, using the one or more computer systems associated with the Post Office, the electronic aggregated listing available to each corresponding bill recipient over a computer network;
    receiving, at the one or more computer systems associated with the Post Office, from one of the bill recipients in the first and second electronic lists of bill recipients, an electronic order instructing the Post Office to cause a payment of at least one of the first and second amounts listed in the electronic aggregated listing;
    sequestering, using the one or more computer systems associated with the Post Office, funds at least equal to the payment specified in the received order from a predetermined numbered account designated by the bill recipient; and
    communicating, from the one or more computer systems associated with the Post Office to one or more computer systems associated with a financial service provider, information instructing the financial service provider to effectuate the payment specified in the received order from the sequestered funds.

2. The method of claim 1, wherein communicating the information comprises communicating information instructing the financial service provider to transfer the ordered payment from a predetermined numbered account designated by the bill recipient to at least one of a first numbered account designated by the first biller and a second numbered account designated by the second biller.

3. The method of claim 1, wherein the financial service provider in the instructing step is the Federal Reserve Bank.

4. The method of claim 1, wherein making the electronic aggregated listing available to each corresponding bill recipient over the computer network comprises generating and sending an email message that includes the aggregated listing of the first and second amounts owed to each of the first and second billers.

5. The method of claim 1, wherein making the electronic aggregated listing available to each corresponding bill recipient over the computer network further comprises printing the aggregated listing of the first and second amounts owed to each of the first and second billers and mailing the printed aggregated listing to each of the bill recipients.

6. The method of claim 4, wherein the email message is secure.

7. The method of claim 4, wherein the generated email message is sent in encrypted foam according to a certificate issued from a trusted certificate issuing authority.

8. The method of claim 7, wherein the trusted certificate issuing authority is the Post Office.

9. The method of claim 1, wherein making the electronic aggregated listing available to each corresponding bill recipient over the computer network comprises making the generated aggregated listing available via a web site.

10. The method of claim 1, wherein receiving an electronic order for at least one of the billing recipients includes receiving detailed payment instructions including at least one of:
    an amount to be paid;
    a date on which a financial institution is to be instructed to effectuate the payment; and
    an indication as to whether the first and/or second amount owed is disputed.

11. The method of claim 1, further comprising generating, with the one or more processors associated with the one or more computer systems associated with the Postal Service, information charging a fee to each of the first and second billers.

12. The method of claim 1, wherein making the aggregated listing available to each corresponding bill recipient over the computer network comprises generating a link to the predetermined numbered account designated by the bill recipient, the link being effective to enable the bill recipient to access at least an account balance of the designated numbered account.

13. The method of claim 1, wherein communicating the information comprises communicating information, in batch mode, that instructs the financial service provider to effectuate a plurality of payments specified in a corresponding plurality of received orders.

14. The method of claim 1, wherein the first and second lists received from the first and second billers are machine-readable.

15. The method of claim 1, wherein receiving the order comprises receiving a multipart draft that details amounts to be paid to each of the first and second billers.

16. The method of claim 1, wherein making the electronic aggregated listing available to each corresponding bill recipient over the computer network further comprises making a promotional message available along with the aggregated listing.

17. The method of claim 16, further comprising printing the aggregated listing of the first and second amounts owed to each of the first and second billers and the promotional message and mailing the aggregated listing of the first and second amounts owed to each of the first and second billers and the promotional message to each of the bill recipients.

18. The method of claim 1, wherein receiving the electronic order comprises receiving information that instructs the Post Office to cause the payment of at the least one of the first and second amounts listed in the aggregated listing at a predetermined date in the future.

19. The computer implemented method of claim 1, wherein generating the electronic aggregated listing is carried out at a predetermined date that is selected by each bill recipient.

20. A machine-readable storage medium having data stored thereon representing sequences of instructions executable by one or more computer systems associated with the Post Office to process bills, the machine-readable storage medium comprising:
   instructions for receiving a first electronic list of bill recipients from a first biller and corresponding first amounts owed to the first biller by each bill recipient in the first electronic list;
   instructions for receiving a second electronic list of bill recipients from a second biller and corresponding second amounts owed to the second biller by each bill recipient in the second list;
   instructions for generating, for each bill recipient in the first and second lists of bill recipients, an electronic aggregated listing of the first and second amounts owed to each of the first and second billers by each corresponding billing recipient;
   instructions for making the aggregated listing available to each corresponding bill recipient over a computer network;
   instructions for receiving, from one of the bill recipients in the first and second electronic lists of bill recipients, an order instructing the Post Office to cause a payment of at least one of the first and second amounts listed in the electronic aggregated listing;
   instructions for sequestering funds at least equal to the payment specified in the received order from a predetermined numbered account designated by the bill recipient; and
   instructions for communicating information instructing a financial service provider to effectuate the payment specified in the received order from the sequestered funds.

21. The machine-readable storage medium of claim 20, wherein the instructions for communicating the information comprise instructions for communicating information that instructs the financial service provider to transfer the ordered payment from a predetermined numbered account designated by the bill recipient to at least one of a first numbered account designated by the first biller and a second numbered account designated by the second biller.

22. The machine-readable storage medium of claim 20, wherein the financial service provider is the Federal Reserve Bank.

23. The machine-readable storage medium of claim 20, wherein the instructions for making the aggregated listing available to each corresponding bill recipient over the computer network comprise instructions for generating and sending an email message that includes the aggregated listing of the first and second amounts owed to each of the first and second billers.

24. The machine-readable storage medium of claim 20, wherein the instructions for making the aggregated listing available to each corresponding bill recipient over the computer network further comprise instructions for printing the aggregated listing of the first and second amounts owed to each of the first and second billers and mailing the printed aggregated listing to each of the each of the bill recipients.

25. The machine-readable storage medium of claim 23, wherein the email message is secure.

26. The machine-readable storage medium of claim 23, wherein the generated email message is sent in encrypted form according to a certificate issued from a trusted certificate issuing authority.

27. The machine-readable storage medium of claim 26, wherein the trusted certificate issuing authority is the Post Office.

28. The machine-readable storage medium of claim 20, wherein the instructions for making the aggregated listing available to each corresponding bill recipient over the computer network comprise instructions for making the aggregated listing available via a web site.

29. The machine-readable storage medium of claim 20, wherein the instructions for receiving the order comprise instructions for receiving detailed payment instructions including at least one of:
   an amount to be paid;
   a date on which a financial institution is to be instructed to effectuate the payment; and
   an indication as to whether the first and/or second amount owed is disputed.

30. The machine-readable storage medium of claim 20, further comprising instructions for charging a fee from each of the first and second billers.

31. The machine-readable storage medium of claim 20, wherein the instructions for making the aggregated listing available to each corresponding bill recipient over the computer network comprise instructions for generating a link to the predetermined numbered account designated by the bill recipient, the link being effective to enable the bill recipient to access at least an account balance of the designated numbered account.

32. The machine-readable storage medium of claim 20, wherein the instructions for communicating the information comprise instructions for communicating information, in batch mode, to instruct the financial service provider to effectuate a plurality of payments specified in a corresponding plurality of received orders.

33. The machine-readable storage medium of claim 20, wherein the first and second lists received from the first and second billers are machine readable.

34. The machine-readable storage medium of claim 20, wherein the instructions for receiving the order comprise instructions for receiving a multipart draft that details amounts to be paid to each of the first and second billers.

35. The machine-readable storage medium of claim 20, wherein the instructions for making the electronic aggregated listing available to each corresponding bill recipient over the computer network further comprise instructions for making a promotional message available along with the aggregated listing.

36. The machine-readable storage medium of claim 20, further comprising instructions for printing the aggregated listing of the first and second amounts owed to each of the first and second billers and the promotional message and mailing the aggregated listing of the first and second amounts owed to each of the first and second billers and the promotional message to each of the bill recipients.

37. The machine-readable storage medium of claim 20, wherein the instructions for receiving the electronic order comprise instructions for receiving information that instructs the United States Post Office to cause the payment of at the least one of the first and second amounts listed in the aggregated listing at a predetermined date in the future.

38. The machine-readable storage medium of claim 20, wherein the instructions for generating the electronic aggregated listing include instructions for generating the aggregated list at a predetermined date that is selected by each bill recipient.

39. A computer-implemented method for postal services to process bills, comprising the steps of:
  receiving, at one or more computer systems associated with a postal service, a list from each of a plurality of billers, each list including bills to be submitted to identified customers;
  from the received lists, generating an electronic aggregated listing for each identified customer with one or more processors associated with the one or more computer systems associated with the postal service, the electronic aggregated listing including the bills to be submitted by each of the plurality of billers to each identified customer;
  making, using the one or more computer systems associated with the postal service, each generated electronic aggregated listing available to each corresponding identified customer over a computer network;
  receiving, at the one or more computer systems, from one or more of the identified customers, one or more electronic orders to effectuate payment of selected ones of the bills in the aggregated listings;
  for each received order, communicating, from the one or more computer system associated with the postal service to one or more computer systems associated with a first trusted entity, information instructing the first trusted entity designated by each identified customer to guarantee availability of funds sufficient to cover payment of the bills selected for payment by sequestering funds, from accounts of the identified customers, that are at least sufficient to cover payment of the bills selected for payment;
  communicating, from the one or more computer system associated with the postal service to one or more computer systems associated with a second trusted entity, information instructing the second trusted entity to carry out the payments specified in each of the received orders by transferring the payments from the funds sequestered by the first trusted entities designated by the customers to respective third trusted entities designated by the billers.

40. The computer implemented method of claim 39, wherein the first and third trusted entities are banks.

41. The computer implemented method of claim 39, wherein the second trusted entity is the United States Federal Reserve Bank.

* * * * *

UNITED STATES PATENT AND TRADEMARK OFFICE
CERTIFICATE OF CORRECTION

PATENT NO.        : 8,140,432 B2
APPLICATION NO.   : 12/855985
DATED             : March 20, 2012
INVENTOR(S)       : Johnson It is certified that error appears in the above-identified patent and that said Letters Patent is hereby corrected as shown below:

In column 3, line 4, delete "each of the each of the" and insert -- each of the --, therefor.

In column 4, line 47, delete "recipients'" and insert -- recipients --, therefor.

In column 5, line 59, after "itself" insert -- . --.

In column 9, line 5, after "akin" delete "a".

In column 12, line 33, in Claim 7, delete "foam" and insert -- form --, therefor.

In column 13, line 18, in Claim 18, after "at" delete "the".

In column 14, line 17, in Claim 24, delete "each of the each of the" and insert -- each of the --, therefor.

In column 15, line 14, in Claim 37, after "at" delete "the".

Signed and Sealed this
Fifth Day of June, 2012

David J. Kappos
*Director of the United States Patent and Trademark Office*